Jan 6, 1931.   J. ROBINSON   1,787,455
AUTOMATIC TRAIN PIPE CONNECTER
Original Filed Feb. 2, 1923
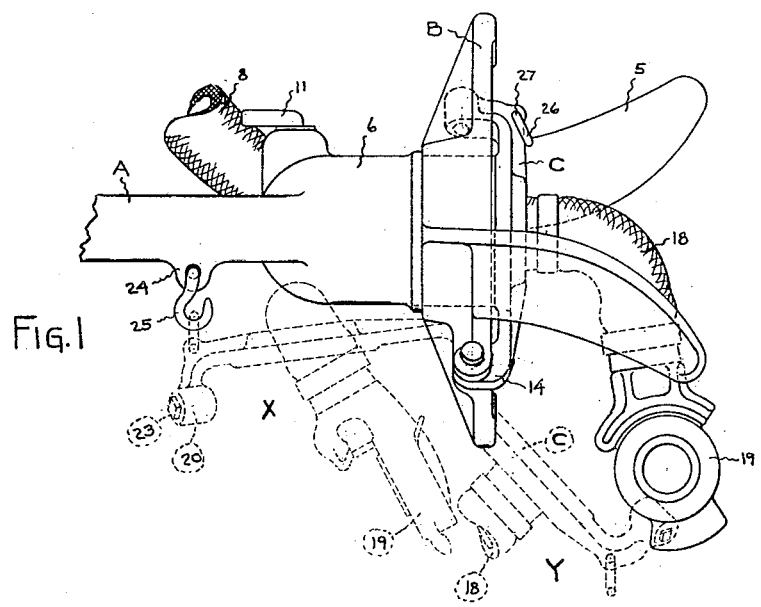
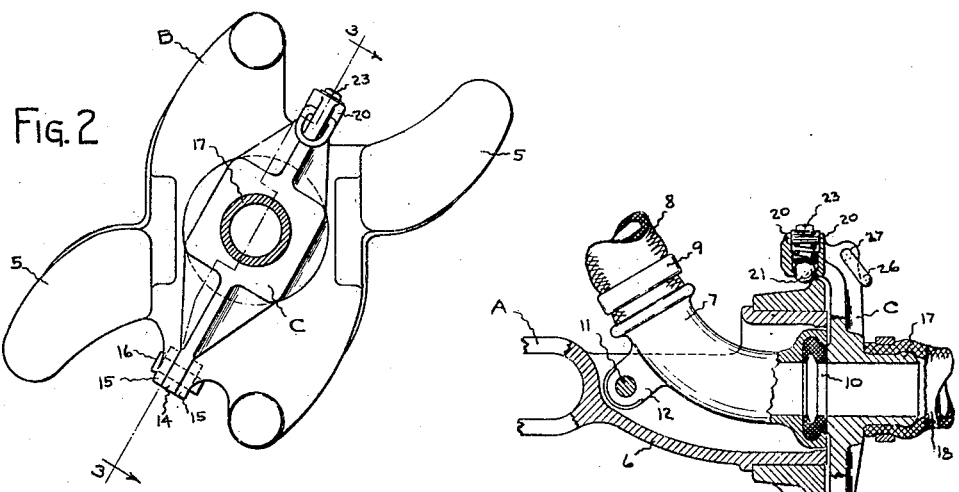
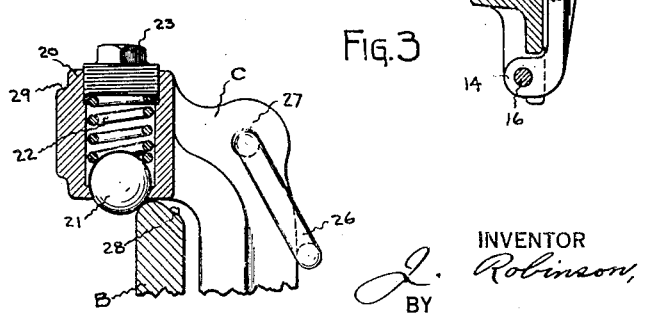
INVENTOR
J. Robinson,
BY
Watson, Coit, Morse & Grindle
ATTORNEY Patented Jan. 6, 1931

1,787,455

UNITED STATES PATENT OFFICE

JOSEPH ROBINSON, OF NEW YORK, N. Y.

AUTOMATIC TRAIN-PIPE CONNECTER

Application filed February 2, 1923, Serial No. 616,592. Renewed October 22, 1926.

My invention relates to improvements in automatic train pipe connecters, and more particularly to interchange devices for such connecters. In my co-pending application Serial No. 575,135, filed July 15th, 1922, I show an improved form of such interchange device. The object of the present invention is to improve the interchange shown in that application by providing it with means whereby the interchange will be automatically disconnected from the service position in the event the cars in interchange are uncoupled without first disconnecting the hose of the unequipped car from the interchange device on the automatic connecter. As is well known, trainmen seldom disconnect the present hand operated hose couplings upon separating the cars, but depend upon the parting of the cars to disengage them. These couplings are so designed that they will separate when a pulling stress of approximately 300 pounds is exerted upon them. While the hose of a car not equipped with an automatic connecter may, in this manner, be disconnected from the interchange device shown in my aforesaid co-pending application, no means is provided therein for automatically disconnecting the interchange from the service position upon such parting of the hose. The result is that in event a trainman neglects to disconnect the interchange device, and swing it out of the service position, damage thereto will be caused when the connecter goes into automatic service again. With my present improvement disconnection of the hose of the unequipped car from the interchange device, as occurs when parting cars without first breaking the connection by hand, is preceded by automatic disconnection of the interchange device itself from the service position. In this manner damage to the interchange device and to the automatic connecter, arising from coupling opposing connecters with an interchange device between their coupling faces, is avoided.

With these and other objects in view, my invention resides in the combinations, constructions and improvements hereinafter described, pointed out in the appended claims and illustrated in the accompanying drawings of which—

Figure 1 is a side elevation of an automatic train pipe connecter head provided with my improved interchange.

Figure 2 is a front elevation of the construction shown in Figure 1, with the hose section and the coupling omitted.

Figure 3 is a sectional view through the interchange device and coupling head taken on substantially the line 3—3 of Figure 2. In this view the pipe and the fitting and the hose are shown in horizontal section as a matter of convenience, and Figure 4 is an enlarged detail view of the automatic locking device of my improvement.

Referring now to the drawings: Any suitable type of support, such as that illustrated in my co-pending application Serial No. 490,340 filed October 6th, 1921, and any desired form of coupling head, may be used with my improvement. I show such a support at A and conventional form of coupling head B having forwardly extending outwardly diverging guiding prongs 5. The head has a centrally located opening into which the enlarged hollow forward end of a suitable pipe 6 is pressed as shown particularly in Figure 3. Extending into the hollow forward end of the pipe 6, I provide a laterally extending hollow conduit 7 directly upon the rear end of which is mounted the usual train pipe hose 8 as by a clamp 9, and at the other end of the conduit I provide an air extended gasket 10. A spring actuated pin 11 passes downwardly through the top wall of the pipe 6 into a suitable lug 12 formed on the rear side of the fitting 7, and serves to lock the fitting in the pipe, all of which is fully described in my aforesaid co-pending application Serial No. 490,340.

Hinged at the lower left side of the head I provide a plate or interchange device C, which is secured to the head by means of a projection 14 on the plate C which passes between spaced lugs 15 formed on the head, a suitable pin 16 being passed through the lugs and the projection to pivotally secure the plate C to the head. Centrally located on the plate I provide a perforated nipple 17 adapted to mate with the gasket 10. Upon this nipple I mount a short section 18 of an ordinary train pipe rubber hose, and in the lower end of this hose I suitably mount the usual hand operated hose coupling head 19. That end of the plate C which is opposite the end 14 thereof is provided with a rearwardly extending or overhanging portion 20 adapted to extend over a portion of the coupling head A as shown, the upper right hand corner of the head being cut away in the manner illustrated in Figure 2 to receive this portion. Within the hollow of the portion 20 I mount a suitable steel ball 21 which is under the compression of a spring 22, the spring being locked in the hollow of the portion 20 by an adjustable nut 23. It will be noted that the nut may be adjusted in or out of the hollow of the portion 20 and thus increase or decrease the compression of the spring 22. This is in order to vary the force required to disconnect the interchange plate C from the service position.

When not in use the interchange device C is carried under and to the rear of coupling head Bm and hence out of the way of the coupling numbers of mating heads, as shown in dotted lines X of Figure 1. To support the interchange in this position I provide a suitable lug 24 formed integrally, the support A and I mount in this a suitable hook 25 adapted to receive a link or other form of support 26 pivotally connected to the interchange plate C as at 27 Figures 2 and 4. It will be noted that the distance from the center of the coupling head B to the center of the pin 16 upon which the plate C is mounted, is considerably greater than the distance from the center of the coupling head to the point where the ball 21 contacts therewith. This is in order to facilitate automatic disconnection of the interchange plate C from the coupling head when a pull occurs on the hose section 18, as in parting cars in interchange without manually breaking the connection.

The operation of my improvement is as follows: When a car equipped with the automatic coupling meets one not so equipped, the interchange device or plate C is disconnected from the hook 26 and is swung into the position shown in full lines in Figure 1. As the interchange is swung into this position the ball 21 rides over the tapered portion 28 of the coupling head B, against the tension of the spring 22, into the position shown particularly in Figures 3 and 4. This operation locks the plate C in the service position with the gasket 10 tightly compressed against the rear face of the nipple 17, that is the portion of the head B against which the ball 21 engages is so shaped that the pressure of the ball will serve to constantly draw the plate C toward the gasket 10. The hose of the unequipped car is then coupled into the hand operating coupling 19 of the interchange C in the usual way, the short section of rubber hose 18 giving sufficient movement to the coupling 19 to readily permit of this operation. Upon disconnecting the cars without first breaking the interchange connection, which is the usual practice, a pulling strain will occur upon the hose 18 and when this strain has reached approximately 250 pounds the ball 21 will move upwardly against the tension of the spring 22 sufficiently to clear the coupling head B and thereby disconnect the plate C from the service position. Further movement of the cars will part the hand operated couplings 25 whereupon the interchanged device C will swing or drop to the position shown in dotted lines Y of Figure 1 and bend out of the way of an opposing coupling head in coupling. Under some conditions of coupling, such as on an abrupt curve, or when one car is considerably higher than another, one of the opposing connecter heads may contact with the interchange device C when in the position shown in dotted lines Y, but this is not objectionable inasmuch as upon such contact the interchange device will swing rearwardly about its pivot 16 and out of the way. When it is desired to manually disconnect the interchange device C from the service position shown in Figure 1, it is but necessary to tap the portion 20 with a rock or other tool sufficiently to break the connection between the ball 21 and the head B, a reinforcement 29 being provided on the portion 20 to protect it against ill effects from this operation.

Having now described my said invention what I claim as new and desire to secure by Letters Patent is:

1. An automatic train pipe connecter, the combination of a coupling head, an interchange device pivoted to one side of said head and adapted to extend across the face thereof, means to clamp said interchange device against the face of said coupling head, a conduit forming a part of said interchange device, a gasket supported on said head and adapted to be forced into tight engagement with the rear face of said conduit by the pressure of the train pipe fluid, and means operating automatically to disconnect the interchange device from the service position when cars are parted.

2. In an automatic train pipe connecter, the combination of a coupling head, an interchange device hinged to said head at one side thereof and adapted to be swung to a position across the face of the head, a hand operated hose coupling attached to said interchange device to receive the hose on a car not equipped with the automatic connecter, and spring actuated means for locking said interchange device in the service position, said means operating also to release said interchange from the service position when subjected to a predetermined pull.

3. In an automatic train pipe connecter, the combination of a coupling head, an interchange device hinged to said head at one side thereof and adapted to be swung to a position across the face of the head, a hand operated hose coupling attached to said interchange device to receive the hose on a car not equipped with the automatic connecter, a spring actuated means for locking said interchange device in the service position, said means operating also to release said interchange from the service position when subjected to a predetermined pull, and means to vary the resistance of said spring to increase or decrease the extent of pull required to disconnect said plate of the service position.

4. In an automatic train pipe connecter, the combination of a coupling head, a conduit in said head, an interchange device hinged to one side of said head and adapted to be swung across the face thereof, a hand operated hose coupling attached to said interchange and having direct communication with said conduit, and spring actuated automatic means for locking said interchange in position as it is swung to final position across said head, said means operating to automatically release the interchange from such position upon a predetermined pull on said hand operated hose coupling, the distance from the center line of said coupling head to the point where said automatic means contacts with said head being less than the distance from the center of said coupling head to the point whereat said interchange device is hinged to said head.

5. In an automatic train pipe connecter, the combination of a coupling head, a conduit in said head, an interchange device hinged to one side of said head and adapted to be swung across the face thereof, a hand operated hose coupling attached to said interchange and having direct communication with said conduit, a spring actuated automatic means for locking said interchange in position as it is swung to final position across said head, said means operating to automatically release the interchange from such position upon a predetermined pull on said hand operated base coupling, the distance from the center line of said coupling head to the point where said automatic means contacts with said head being less than the distance from the center of said coupling head to the point whereat said interchange device is hinged to said head, and means to support said interchange device out of the way of an opposing coupling head when said interchange is not in service.

6. In an automatic train pipe connecter, the combination of coupling head having a conduit provided with a gasket, an interchange device pivoted to one end of said head and adapted to be swung across the face thereof, a conduit on the interchange device in alignment with said gasket, a spring actuated automatic means for locking said interchange in position across the face of said coupling head, and means on said head to facilitate the operation of said automatic means as said interchange device moves to final seat across said head.

7. In an automatic train pipe connecter the combination of a coupling head, a support for said head, an interchange device one end of which is pivotally supported on one side of said head, said interchange device being adapted to be swung from a position behind said coupling head to a position across the coupling, cooperating means carried by said device and said head for automatically clamping said device in position when the same is swung across the face of the head, said means also acting to press said device against the face of the head, and a hand operated hose coupling attached to said interchange to connect thereto the hose of a car not equipped with an automatic connecter.

8. In an automatic train pipe connecter, the combination of a coupling head, an interchange device one end of which is pivotally supported on one side of said head, said interchange device being adapted to be swung from a position behind said coupling head to a position across the coupling face thereof, a spring-pressed member carried by said device and adapted to engage a part of said head and hold the interchange device against the face of the head when said interchange device has been swung into position across the face of the head, and a hand-operated hose coupling attached to said interchange device to connect thereto the hose of a car not equipped with an automatic connecter.

In testimony whereof I hereunto affix my signature.

JOSEPH ROBINSON.